(12) United States Patent
Liu

(10) Patent No.: US 9,086,604 B2
(45) Date of Patent: Jul. 21, 2015

(54) ARRRAY SUBSTRATE AND DISPLAY DEVICE

(71) Applicants: BOE Technology Group Co., Ltd., Beijing (CN); Beijing BOE Display Technology Co., Ltd., Beijing (CN)

(72) Inventor: Sha Liu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/018,666

(22) Filed: Sep. 5, 2013

(65) Prior Publication Data

US 2014/0061646 A1 Mar. 6, 2014

(30) Foreign Application Priority Data

Sep. 5, 2012 (CN) .......................... 2012 1 0326702

(51) Int. Cl.
| | |
|---|---|
| H01L 29/04 | (2006.01) |
| H01L 31/036 | (2006.01) |
| G02F 1/1362 | (2006.01) |
| G02F 1/1343 | (2006.01) |

(52) U.S. Cl.
CPC ........ *G02F 1/1362* (2013.01); *G02F 1/134363* (2013.01); *G02F 2001/134318* (2013.01); *G02F 2001/134372* (2013.01); *G02F 2201/124* (2013.01)

(58) Field of Classification Search
CPC . H01L 27/124; H01L 27/3297; G02F 1/1362; G02F 1/134363

USPC ................................. 257/49, 59, 72; 349/141
See application file for complete search history.

(56) References Cited

U.S. PATENT DOCUMENTS

| | | |
|---|---|---|
| 2007/0070282 A1 | 3/2007 | Shibahara et al. |
| 2010/0134744 A1* | 6/2010 | Lee et al. ...................... 349/143 |
| 2012/0154730 A1* | 6/2012 | Sakurai et al. ................ 349/141 |

FOREIGN PATENT DOCUMENTS

| | | |
|---|---|---|
| EP | 1793266 A | 6/2007 |
| EP | 1793266 A1 | 6/2007 |
| JP | 2009-181091 A | 8/2009 |

OTHER PUBLICATIONS

First Office Action issued by State Intellectual Property Office of the People's Republic of China for Chinese Patent Application No. 201210326702.X dated Jul. 2, 2014, 4pgs.

(Continued)

*Primary Examiner* — Tu-Tu Ho

(57) ABSTRACT

Embodiments of the invention provide an array substrate and a display device. The array substrate comprises a common electrode and a pixel electrode that are formed on a base substrate. The common electrode comprises a first common electrode and a second common electrode, the first common electrode is provided below the pixel electrode and separated from the pixel electrode by an insulating layer, the second common electrode is provided in the same layer as the pixel electrode. The pixel electrode comprises a plurality of strip electrodes, the second common electrode also comprises a plurality of strip electrodes, and the strip electrodes of the pixel electrode and the strip electrodes of the second common electrode are alternately arranged.

6 Claims, 6 Drawing Sheets

(56) References Cited

OTHER PUBLICATIONS

English translation of First Office Action issued by State Intellectual Property Office of the People's Republic of China for Chinese Patent Application No. 201210326702.X dated Jul. 2, 2014, 4pgs.
Rejection Decision issued by the Chinese Patent Office for Chinese Patent Application No. 201210326702.X dated Sep. 3, 2014, 5pgs.
English translation of Rejection Decision issued by the Chinese Patent Office for Chinese Patent Application No. 201210326702.X dated Sep. 3, 2014, 6pgs.

Extended European search report issued by the European Patent Office on Dec. 12, 2013 for International Application No. 13183084.6, 10 pages.
English abstract of JP2009-181091 21 pages.
Notification of Reexamination issued by the Chinese Patent Office for Chinese Patent Application No. 20121032670.2 dated Feb. 13, 2015, seven (7) pages.
English Translation of Rejection Decision issued by the Chinese Patent Office for Chinese Patent Application No. 20121032670.2 dated Feb. 13, 2015, seven (7) pages.
English abstract of EP1793266A1, two (2) pages.

\* cited by examiner

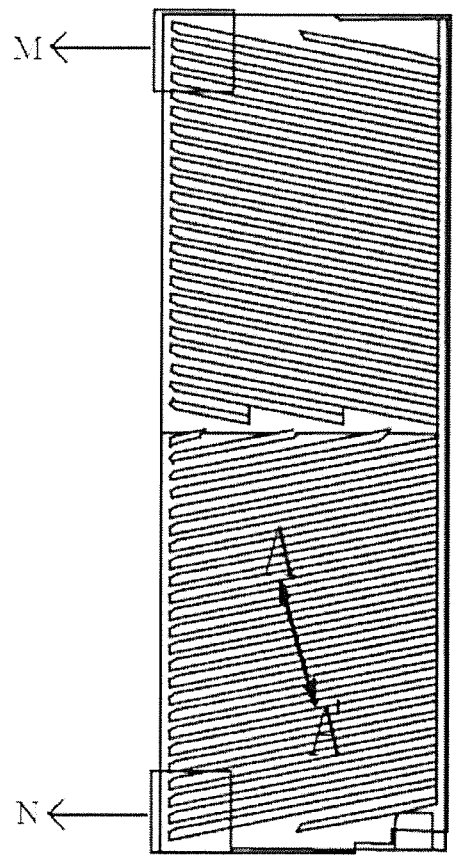
Fig. 1 - PRIOR ART
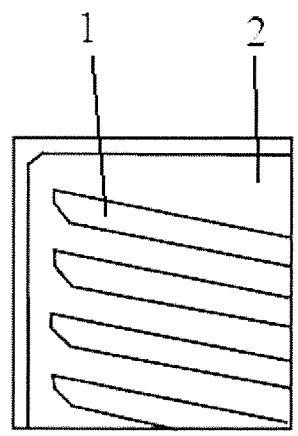
Fig. 1a - PRIOR ART

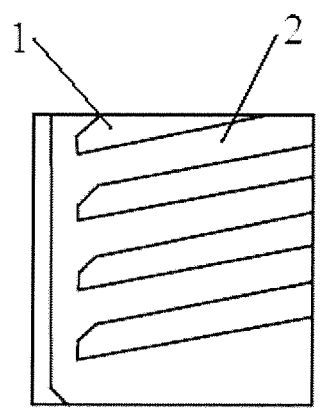
Fig. 1b - PRIOR ART
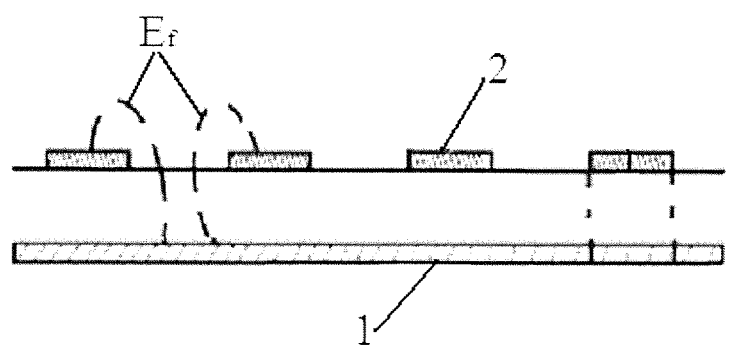
Fig. 2 - PRIOR ART

ARRRAY SUBSTRATE AND DISPLAY DEVICE

CROSS REFERENCE TO RELATED APPLICATIONS

This application claims priority from Chinese National Application No. 201210326702.X filed on Sep. 5, 2012, the contents of which are incorporated herein by reference.

TECHNICAL FIELD

Embodiments of the invention relate to an array substrate and a display device.

BACKGROUND

In recent years, thin film transistor liquid crystal display (TFT-LCD) gradually dominates the market of flat panel display due to its advantages of lower power consumption, no radiation and so on.

FIG. 1 is a plan schematic view illustrating a portion of an array substrate in a conventional TFT-LCD. FIG. 1a and FIG. 1b are enlarged views of regions M and N in FIG. 1. FIG. 2 is a sectional view taken along line A-A' in FIG. 1. A common electrode and a pixel electrode are provided on the array substrate. The common electrode 1 is a plate electrode. The pixel electrode 2 has a plurality of strip electrodes. The pixel electrode 2 is provided above the common electrode 1. A fringe electric field $E_f$ is formed between the pixel electrode 2 and the common electrode 1. There is a large overlap region between the common electrode 1 and the pixel electrode 2, that is, the projection of the common electrode 1 on a base substrate of the array substrate and the projection of the pixel electrode 2 on the base substrate have a large overlap region, and therefore the storage capacitance formed between the common electrode 1 and the pixel electrode 2 is relatively large. In the TFT-LCD has the array substrate described above, defects relating to the charge and discharge of pixel easily occur. This problem may be more serious for the TFT-LCD with big size and high frequency.

SUMMARY

According to an aspect of the invention, an array substrate is provided. The array substrate comprises a common electrode and a pixel electrode that are formed on a base substrate. The common electrode comprises a first common electrode and a second common electrode, the first common electrode is provided below the pixel electrode and separated from the pixel electrode by an insulating layer, the second common electrode is provided in the same layer as the pixel electrode. The pixel electrode comprises a plurality of strip electrodes, the second common electrode also comprises a plurality of strip electrodes, and the strip electrodes of the pixel electrode and the strip electrodes of the second common electrode are alternately arranged.

According to another aspect of the invention, a display device is provided. The display device comprises the array substrate described above.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

FIG. 1 is a plan schematic view illustrating a portion of an array substrate in a conventional TFT-LCD;

FIG. 1a is an enlarged view illustrating a region M in FIG. 1;

FIG. 1b is an enlarged view illustrating a region N in FIG. 1;

FIG. 2 is a sectional view taken along line A-A' in FIG. 1, in which an electric field formed between the electrodes provided on the array substrate is illustrated;

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Embodiment 1

Figure 3:
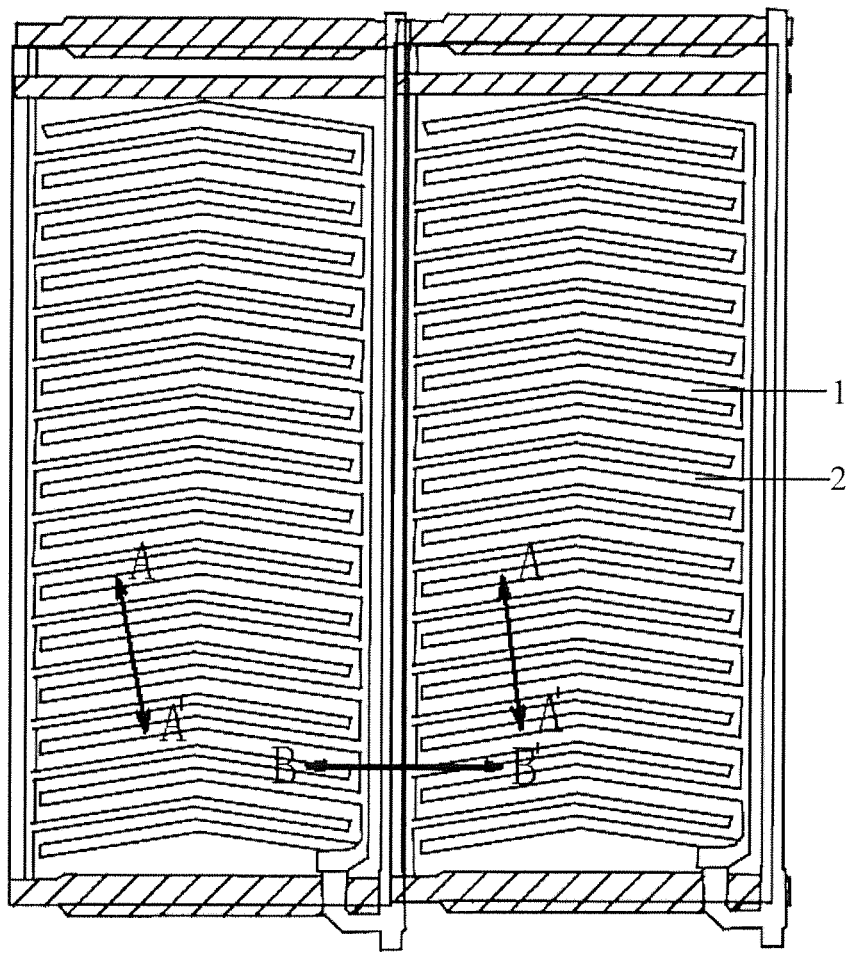
FIG. 3 is a plan schematic view illustrating a portion of an array substrate according to an embodiment 1 of the invention.
Figure 4:
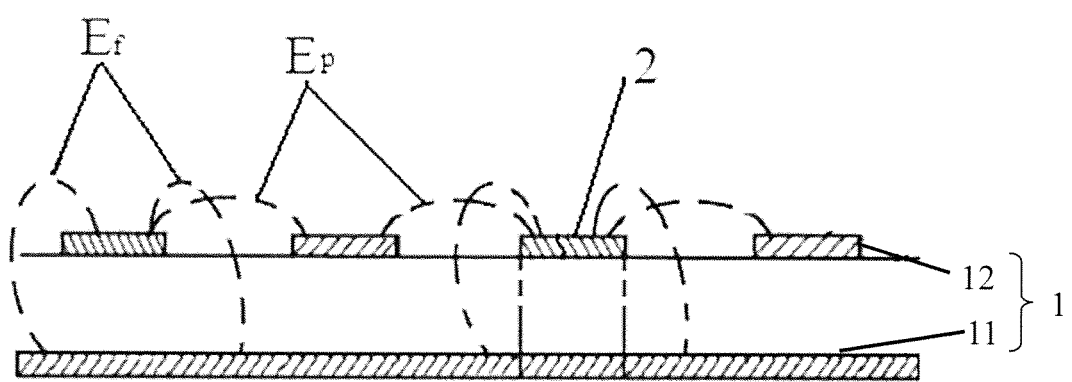
FIG. 4 is a sectional view taken along line A-A' in FIG. 3, in which electric fields formed between the electrodes provided on the array substrate according to the embodiment 1 of the invention are illustrated.

The embodiment provides an array substrate, and the array substrate comprises a common electrode 1 and a pixel electrode 2. FIG. 3 is a plan schematic view illustrating a portion of the array substrate according to the embodiment. FIG. 4 is a sectional view taken along line A-A' in FIG. 3, in which electric fields formed between the pixel electrode 1 and the common electrode 2 are illustrated. With reference to FIGS. 3 and 4, the pixel electrode 2 comprises a plurality of strip electrodes, and the common electrode 1 comprises a first common electrode 11 provided below the pixel electrode 2 and separated from the pixel electrode 2 by an insulating layer (see FIG. 4) and a second common electrode 12 provided in a same layer as the pixel electrode 2 (see FIG. 4). The second common electrode 12 also comprises a plurality of strip electrodes, and the strip electrodes of the second common electrode 12 and the strip electrodes of the pixel electrode 2 are alternately arranged. The first common electrode 11 provided below the pixel electrode 2 forms a fringe electric field $E_f$ with the pixel electrode 2, and the second common electrode 12 provided in the same layer as the pixel electrode 2 forms an in-plane electric field $E_p$ with the pixel electrode 2. The fringe electric field $E_f$ and the in-plane electric field $E_p$ exist simultaneously, so that the control for the liquid crystal can be enhanced and the light transmission can be increased.

Further, the first common electrode 11 is provided as a plate electrode. A projection of the strip electrodes of the pixel electrode 2 on a base substrate of the array substrate is referred to as a first projection, and a projection of the first common electrode 11 on the base substrate is referred to as a second projection. The first projection completely falls within the second projection, that is, the area of the overlap region between the first projection and the second projection is the area of the first projection. Because the second common electrode 12 is provided in the same layer as the pixel electrode 2, the area of the pixel electrode 2 is reduced, and thus the area of the overlap region between the pixel electrode 2 and the first common electrode 11 (i.e. the area of the overlap region between the first projection and the second projection) is reduced. Therefore, the storage capacitance formed between the pixel electrode 2 and the first common electrode 11 can be reduced, and the defects of charge and discharge caused by the large storage capacitance can be avoided.

In the embodiment, the strip electrodes of the pixel electrode 2 are arranged at an equal distance. The overlap region between each strip electrode of the pixel electrode 2 and the first common electrode 11 has a width of about 6 μm-10 μm. Since the overlap region between each strip electrode of the pixel electrode 2 and the first common electrode 11 is the region of each strip electrode of the pixel electrode 2 itself, the above width actually is the width of each strip electrode of the pixel electrode 2. The storage capacitance formed between the pixel electrode 2 and the first common electrode 11 is used to maintain the voltage of the pixel electrode 2. If the above width is too large, the storage capacitance is relatively large, thus a charge defect of the pixel electrode 2 occurs and the pixel electrode can not be charged fully. If the width is too small, the storage capacitance can not effectively maintain the voltage of pixel electrode 2.

Figure 5:
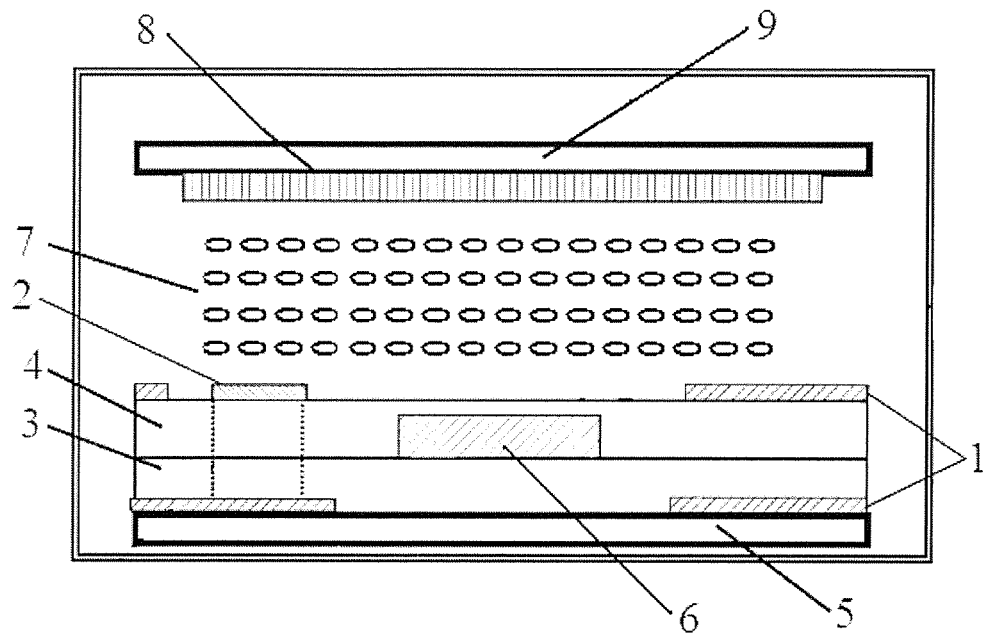
FIG. 5 is a sectional view corresponding to line B-B' in FIG. 3, in which a display device according to the embodiment 1 of the invention is illustrated.

The embodiment further provides a display device. FIG. 5 is a sectional view corresponding to line B-B' in FIG. 3, in which the display device according to the embodiment is illustrated. With reference to FIG. 5, the display device comprises an array substrate 5, a color filter substrate 9, and a liquid crystal layer 7 provided between the array substrate 5 and the color filter substrate 9. The array substrate 5 is similar to the array substrate described above. Specifically, the array substrate 5 comprises a first common electrode 11 which is a plate electrode, an insulating layer 3, a data line 6, a passivation layer 4, a pixel electrode 2 and a second common electrode 12 provided in a same layer as the pixel electrode 2. The pixel electrode 2 comprises a plurality of strip electrodes, the second common electrode 12 also comprises a plurality of strip electrodes, and the strip electrodes of the pixel electrode 2 and the strip electrodes of the second common electrode 12 are arranged alternately. The color filter substrate 9 may have a normal structure. For example, a light-blocking film 8 is provided on the color filter substrate 9.

As shown in FIG. 3, each strip electrode of the pixel electrode 2 and each strip electrode of the second common electrode 12 respectively comprises two electrode portions, and the two electrode portions are integrally formed. An angle is formed between the two electrode portions. That is, each strip electrode of the pixel electrode 2 and each strip electrode of the second common electrode 12 are a bent strip, respectively.

The above display device may be any products or components having the display function, such as liquid crystal display panel, electronic paper, OLED display panel, mobile phone, tablet computer, television, monitor, note-book computer, digital photo frame, navigator and the like.

By the array substrate according to the embodiment, the light transmission can be increased, and thus the energy consumption of a back light can be reduced. In addition, the low light transmission in the center of the pixel region of the conventional TFT-LCD can be avoided by using the pixel electrode with strip electrodes.

Embodiment 2

Figure 6:
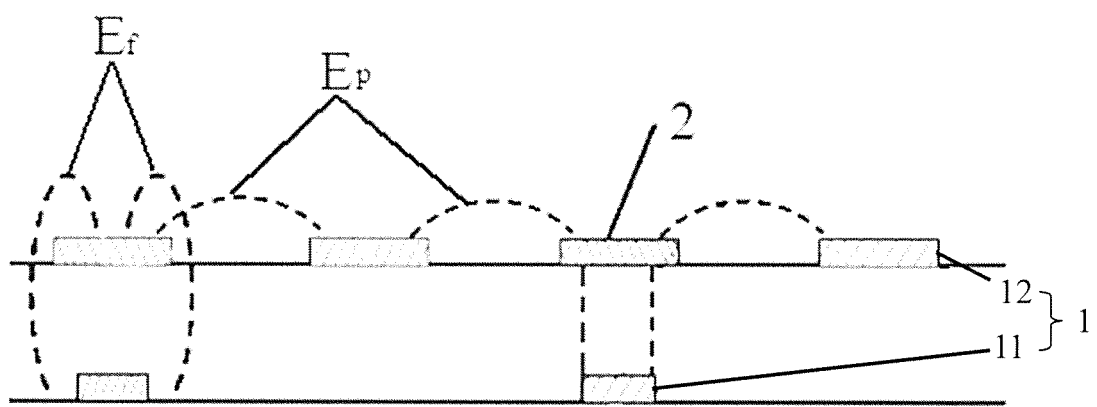
FIG. 6 is a sectional view corresponding to line A-A' in FIG. 3, in which electric fields formed between the electrodes provided on an array substrate according to an embodiment 2 of the invention are illustrated.

The embodiment provides an array substrate. FIG. 6 is a sectional view corresponding to line A-A' in FIG. 3, in which electric fields formed between the electrodes provided on the array substrate according to the embodiment are illustrated. With reference to FIG. 6, the structure of the array substrate is similar to that of the above embodiment 1 except that the first common electrode 11 in the embodiment also comprises a plurality of strip electrodes. A width of each strip electrode of the first common electrode 11 is less than a width of each strip electrode of the pixel electrode 2. A projection of each strip electrode of the pixel electrode 2 on the base substrate is referred as to a first projection, a projection of each strip electrode of the first common electrode 11 on the base substrate is referred as to a second projection, and the second projection completely falls within the first projection.

In the embodiment, the width of the strip electrode of the first common electrode 11 is provided to be smaller than the width of the strip electrode of the pixel electrode 2, and thus the storage capacitance can be reduced while the fringe electric field $E_f$ and the in-plane electric field $E_p$ are formed. The overlap region between each strip electrode of the pixel electrode 2 and each strip electrode of the first common electrode 11 also has a width of about 6 μm-10 μm, that is, the width of each strip electrode of the first common electrode 11 is about 6 μm-10 μm.

Figure 7:
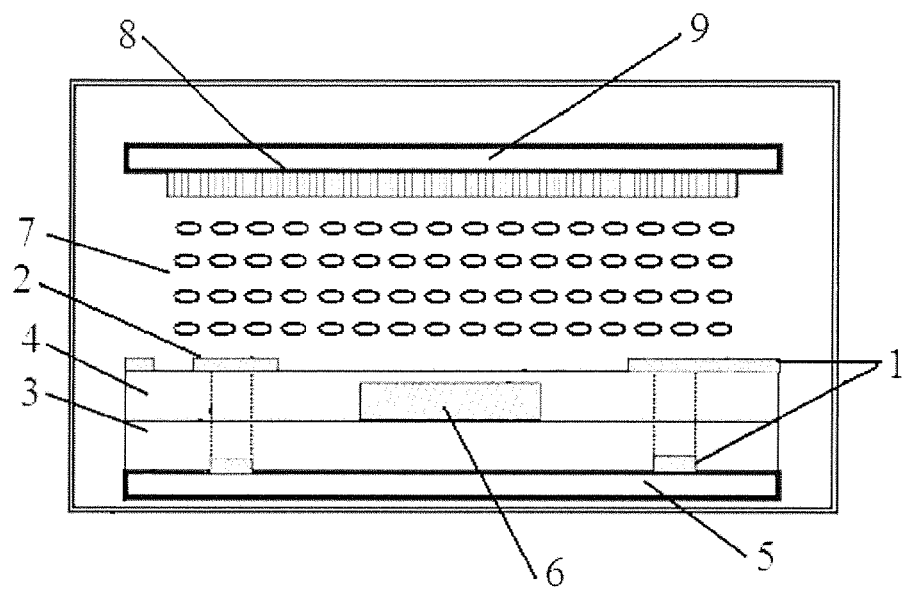
FIG. 7 is a sectional view corresponding to line B-B' in FIG. 3, in which a display device according to the embodiment 2 of the invention is illustrated.

The embodiment further provides a display device. FIG. 7 is a sectional view corresponding to line B-B' in FIG. 3, in which the display device according to the embodiment is illustrated. With reference to FIG. 7, the structure of the display device according to the embodiment is similar to that of the display device according to the embodiment 1 shown in FIG. 5 except for the structure of the first common electrode 11.

In the array substrate and the display device according to the embodiment, the storage capacitance formed between the common electrode 1 and the pixel electrode 2 is reduced, and thus the defects of charge and discharge caused by the large storage capacitance can be avoided. Since the fringe electric field $E_f$ and the in-plane electric field $E_p$ exist simultaneously, the control for the liquid crystal can be enhanced and the light transmission can be increased. In addition, in the case that the light transmission is increased, the energy consumption of a back light can be reduced.

Embodiment 3

Figure 8:
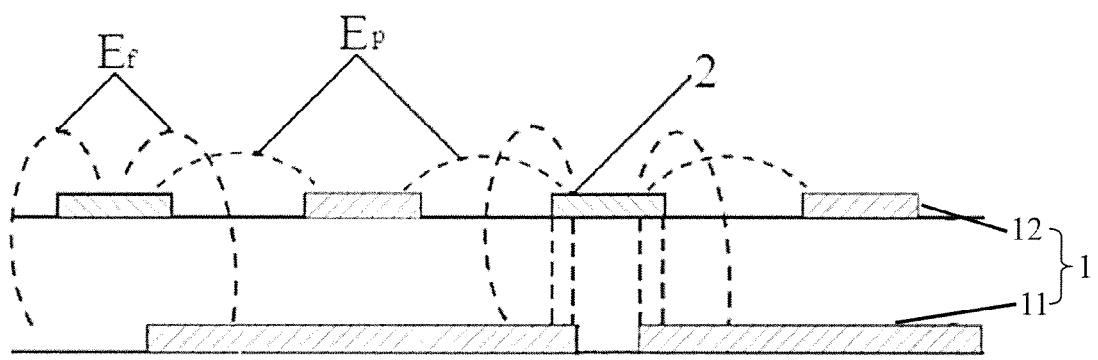
FIG. 8 is a sectional view corresponding to line A-A' in FIG. 3, in which electric fields formed between the electrodes provided on an array substrate according to an embodiment 3 of the invention is illustrate.

The embodiment provides an array substrate. FIG. 8 is a sectional view corresponding to line A-A' in FIG. 3, in which electric fields formed between the electrodes provided on the array substrate according to the embodiment are illustrated. With reference to FIG. 8, the structure of the array substrate is similar to that of the above embodiment 1 except that the first common electrode 11 in the embodiment also comprises a plurality of strip electrodes. A projection of each strip electrode of the pixel electrode 2 on the base substrate is referred as to a first projection, a projection of each strip electrode of the first common electrode 11 on the base substrate is referred as to a second projection, and two ends of the first projection along the width direction overlap with two second projections adjacent to the first projection, respectively. More specifically, the width of the strip electrode of the first common electrode 11 is larger than the interval between two adjacent strip electrodes of the pixel electrode 2, and at the same time, the width of the strip electrode of the pixel electrode 2 is larger than the interval between two adjacent strip electrodes of the first common electrode 11. In this case, the strip electrode of the first common electrode 11 partially overlaps with two strip electrodes of the pixel electrode 2 that are adjacent to the strip electrode of the first common electrode 11, and the strip electrode of the pixel electrode 2 partially overlaps with two strip electrodes of the first common electrode 11 that are adjacent to the strip electrode of the pixel electrode 2.

In the embodiment, the overlap region between the strip electrode of the first common electrode 11 and the strip electrode of the pixel electrode 2 is relatively small, and the overlap region has a width of about 6 μm-10 μm. Accordingly, the storage capacitance can be reduced while the fringe electric field $E_f$ and the in-plane electric field $E_p$ are formed.

Figure 9:
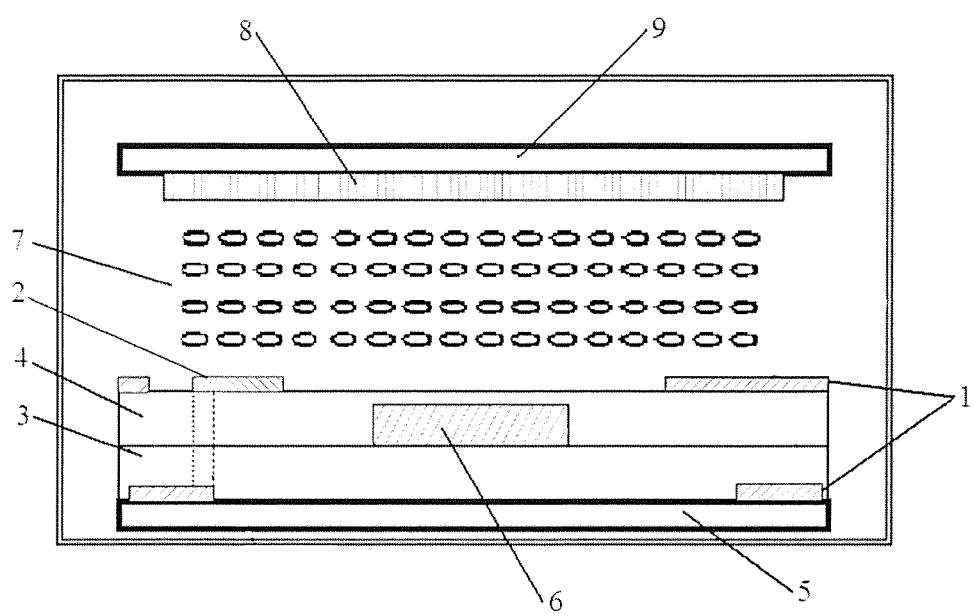
FIG. 9 is a sectional view corresponding to line B-B' in FIG. 3, in which a display device according to the embodiment 3 of the invention is illustrated.

The embodiment further provides a display device. FIG. 9 is a sectional view corresponding to line B-B' in FIG. 3, in which the display device according to the embodiment is illustrated. With reference to FIG. 9, the structure of the display device according to the embodiment is similar to that of the display device according to the embodiment 1 shown in FIG. 5 except for the structure of the first common electrode 11.

In the array substrate and the display device according to the embodiment, the storage capacitance formed between the common electrode 1 and the pixel electrode 2 is reduced, and thus the defects of charge and discharge caused by the large storage capacitance can be avoided. Since the fringe electric field $E_f$ and the in-plane electric field $E_p$ exist simultaneously, the control for the liquid crystal can be enhanced and the light transmission can be increased. In addition, in the case that the light transmission is increased, the energy consumption of a back light can be reduced.

In the array substrate and the display device according to the embodiments of the invention, the pixel electrode comprises the plurality of strip electrodes, the common electrode comprises the first common electrode and the second common electrode, the first common electrode is provided below the pixel electrode, the second common electrode is provided in the same layer as the pixel electrode and also comprises the plurality of strip electrodes, the first common electrode and the pixel electrode form the fringe electric field, and the strip electrodes of the second common electrode and the strip electrodes of the pixel electrode are alternately arranged so that the in-plane electric field is formed between the pixel electrode and the second common electrode. Since the fringe electric field and the in-plane electric field exist simultaneously, the control for the liquid crystal can be enhanced and the light transmission can be increased. In addition, in the case that the light transmission is increased, the energy consumption of a back light can be reduced. In addition, the low light transmission in the center of the pixel region of the conventional TFT-LCD can be avoided by using the pixel electrode with strip electrodes. Furthermore, since the second common electrode is provided in the same layer as the pixel electrode, the area of the pixel electrode is reduced, so that the area of the overlap region between the pixel electrode and the first common electrode can be reduced and the defects of charge and discharge caused by the large storage capacitance can be avoided.

The foregoing are only preferable embodiments of the invention. It is to be noted that, those with ordinary skills in the art may make various modifications and changes without departing the technical principle of the invention, and these modifications and changes should be deemed to be within the protection scope of the invention.

What is claimed is:

1. An array substrate, comprising a common electrode and a pixel electrode that are formed on a base substrate, wherein
the common electrode comprises a first common electrode and a second common electrode, the first common electrode is provided below the pixel electrode and separated from the pixel electrode by an insulating layer, the second common electrode is provided in the same layer as the pixel electrode,
the pixel electrode comprises a plurality of strip electrodes, the second common electrode also comprises a plurality of strip electrodes, and the strip electrodes of the pixel electrode and the strip electrodes of the second common electrode are alternately arranged,
the first common electrode also comprises a plurality of strip electrodes, and
a projection of each strip electrode of the pixel electrode on the base substrate is referred as to a first projection, a projection of each strip electrode of the first common electrode on the base substrate is referred as to a second projection, and two ends of the first projection along a width direction of the first projection overlap with portions of two second projections respectively adjacent to the first projection.

2. The array substrate according to claim 1, wherein a width of each strip electrode of the first common electrode is larger than an interval between two adjacent strip electrodes of the pixel electrode.

3. The array substrate according to claim 1, wherein a width of each strip electrode of the pixel electrode is larger than an interval between two adjacent strip electrodes of the first common electrode.

4. The array substrate according to claim 1, wherein an overlap region between the first projection and the second projection has a width of about 6 μm-10 μm.

5. The array substrate according to claim 1, wherein each strip electrode of the pixel electrode and each strip electrode of the second common electrode respectively comprises two electrode portions, the two electrode portions are integrally formed, and an angle is formed between the two electrode portions.

6. A display device, wherein the display device comprises the array substrate according to claim 1.

* * * * *